(12) United States Patent
Bian

(10) Patent No.: US 11,480,764 B2
(45) Date of Patent: Oct. 25, 2022

(54) CAMERA OPTICAL LENS

(71) Applicant: AAC Optics Solutions Pte. Ltd., Singapore (SG)

(72) Inventor: Xuqi Bian, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 284 days.

(21) Appl. No.: 16/942,791

(22) Filed: Jul. 30, 2020

(65) Prior Publication Data

US 2021/0048613 A1 Feb. 18, 2021

(30) Foreign Application Priority Data

Aug. 16, 2019 (CN) .......................... 201910760432.5

(51) Int. Cl.
*G02B 9/34* (2006.01)
*G02B 13/00* (2006.01)
*G02B 27/00* (2006.01)

(52) U.S. Cl.
CPC ............. *G02B 13/004* (2013.01); *G02B 9/34* (2013.01); *G02B 27/0025* (2013.01)

(58) Field of Classification Search
CPC ................................. G02B 13/004; G02B 9/34
See application file for complete search history.

(56) References Cited

U.S. PATENT DOCUMENTS

2019/0101724 A1* 4/2019 Chen .................... G02B 13/14

* cited by examiner

*Primary Examiner* — Joseph P Martinez
(74) *Attorney, Agent, or Firm* — W&G Law Group

(57) ABSTRACT

The present disclosure provides a camera optical lens, which includes, from an object side to an image side in sequence: a first lens having a positive refractive power; a second lens having a positive refractive power; a third lens having a positive refractive power; a fourth lens having a refractive power; where the camera optical lens satisfies following conditions: $10.00 \le d5/d6 \le 25.00$; $2.00 \le f2/f \le 9.00$; $3.00 \le (R7+R8)/(R7-R8) \le 25.00$; and $-2.00 \le f4/f \le 10.41$. The camera optical lens satisfies a design requirement of a large aperture, ultra-thinness and a wide angle while having good optical functions.

8 Claims, 8 Drawing Sheets

CAMERA OPTICAL LENS

TECHNICAL FIELD

The present disclosure relates to optical lens, in particular, to a camera optical lens suitable for handheld devices, such as smart phones and digital cameras, and imaging devices, such as monitors or PC lenses.

BACKGROUND

In recent years, with the rise of smart phones, the need for miniaturized camera lenses are increasing, and the photosensitive devices of general camera lenses are charge coupled device (CCD) or complementary metal oxide semiconductor sensors (CMOS Sensor). Due to the advancement of semiconductor manufacturing process technology, the pixel size of the photosensitive devices has reduced. As the current development trend of electronic products goes towards better functions and thinner and smaller dimensions, miniature camera lenses with good imaging quality is becoming a mainstream in the market.

In order to obtain better imaging quality, a mini-lens that is traditionally equipped in a mobile phone camera adopts a three-piece lens structure. However, with the development of technology and the increase of users' diversified needs, the pixel size of the photosensitive device continues to reduce, and the system's imaging quality requirements continue to increase, therefore, the fourth-piece lens structure gradually appears in the lens design. Although a fourth-piece lens has good optical functions, the lens is fairly unreasonable in terms of setting of optical power, lens spacing, and lens shape, rendering that the lens structure with good optical functions cannot satisfy a design requirement of a large aperture, ultra-thinness and a wide angle.

SUMMARY

To address the above issues, the present disclosure seeks to provide a camera optical lens that satisfies a design requirement of a large aperture, ultra-thinness and a wide angle while having good optical functions.

To solve the above technical problem, embodiments of the present disclosure provide a camera optical lens, which includes, from an object side to an image side in sequence: a first lens having a positive refractive power; a second lens having a positive refractive power; a third lens having a positive refractive power; a fourth lens having a refractive power; wherein the camera optical lens satisfies following conditions:

$10.00 \leq d5/d6 \leq 25.00$;

$2.00 \leq f2/f \leq 9.00$;

$-2.00 \leq f4/f \leq 10.41$; and $3.00 \leq (R7+R8)/(R7-R8) \leq 25.00$;

where d5 denotes an on-axis thickness of the third lens, d6 denotes an on-axis distance from an image-side surface of the third lens to an object-side surface of the fourth lens, f2 denotes a focal length of the second lens, f denotes a focal length of the camera optical lens, f4 denotes a focal length of the fourth lens, R7 denotes a curvature radius of an object-side surface of the fourth lens, and R8 denotes a curvature radius of an image-side surface of the fourth lens.

As an improvement, the camera optical lens further satisfies the following condition:

$0.10 \leq d1/TTL \leq 0.30$;

where d1 denotes an on-axis thickness of the first lens, and TTL denotes a total optical length from an object-side surface of the first lens to an image surface of the camera optical lens along an optical axis.

As an improvement, the camera optical lens further satisfies the following condition:

$-5.00 \leq (R1+R2)/(R1-R2) \leq -0.50$;

where R1 denotes a curvature radius of an object-side surface of the first lens, R2 denotes a curvature radius of an image-side surface of the first lens, and d1 denotes an on-axis thickness of the first lens.

As an improvement, the camera optical lens further satisfies the following condition:

$0.73 \leq f1/f \leq 5.07$;

where f1 denotes a focal length of the first lens.

As an improvement, the camera optical lens further satisfies the following conditions:

$-9.13 \leq (R3+R4)/(R3-R4) \leq 11.37$; and $0.05 \leq d3/TTL \leq 0.24$;

where R3 denotes a curvature radius of an object-side surface of the second lens, R2 denotes a curvature radius of an image-side surface of the second lens, d3 denotes an on-axis thickness of the second lens, and TTL denotes a total optical length from an object-side surface of the first lens to an image surface of the camera optical lens along an optical axis.

As an improvement, the camera optical lens further satisfies the following conditions:

$0.40 \leq f3/f \leq 40.78$;

$-52.95 \leq (R5+R6)/(R5-R6) \leq 5.93$;

$0.05 \leq d5/TTL \leq 0.25$;

where f3 denotes a focal length of the third lens, R5 denotes a curvature radius of an object-side surface of the third lens, R6 denotes a curvature radius of an image-side surface of the third lens, and TTL denotes a total optical length from an object-side surface of the first lens to an image surface of the camera optical lens along an optical axis.

As an improvement, the camera optical lens further satisfies the following conditions:

$0.03 \leq d7/TTL \leq 0.22$;

where d7 denotes an on-axis thickness of the fourth lens, and TTL denotes a total optical length from an object-side surface of the first lens to an image surface of the camera optical lens along an optical axis.

As an improvement, the camera optical lens further satisfies the following condition:

$FNO \leq 1.84$;

where FNO denotes an F number of the camera optical lens.

As an improvement, the camera optical lens further satisfies the following condition:

$0.58 \leq f12/f \leq 2.81$;

where f12 denotes a combined focal length of the first lens and the second lens.

The present disclosure is advantageous in: the camera optical lens in the present disclosure has good optical functions and has characteristics of a large aperture, a wide angle and ultra-thinness, and is especially fit for WEB camera lenses and mobile phone camera lens assemblies composed by such camera elements as CCD and CMOS for high pixels.

BRIEF DESCRIPTION OF DRAWINGS

In order to more clearly explain technical solutions in the embodiments of the present invention, the drawings required in the description of the embodiments will be briefly introduced below. Obviously, the drawings in the following description are only some embodiments of the present invention. For those of ordinary skill in the art, without making any creative efforts, other drawings can also be obtained based on these drawings, where.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
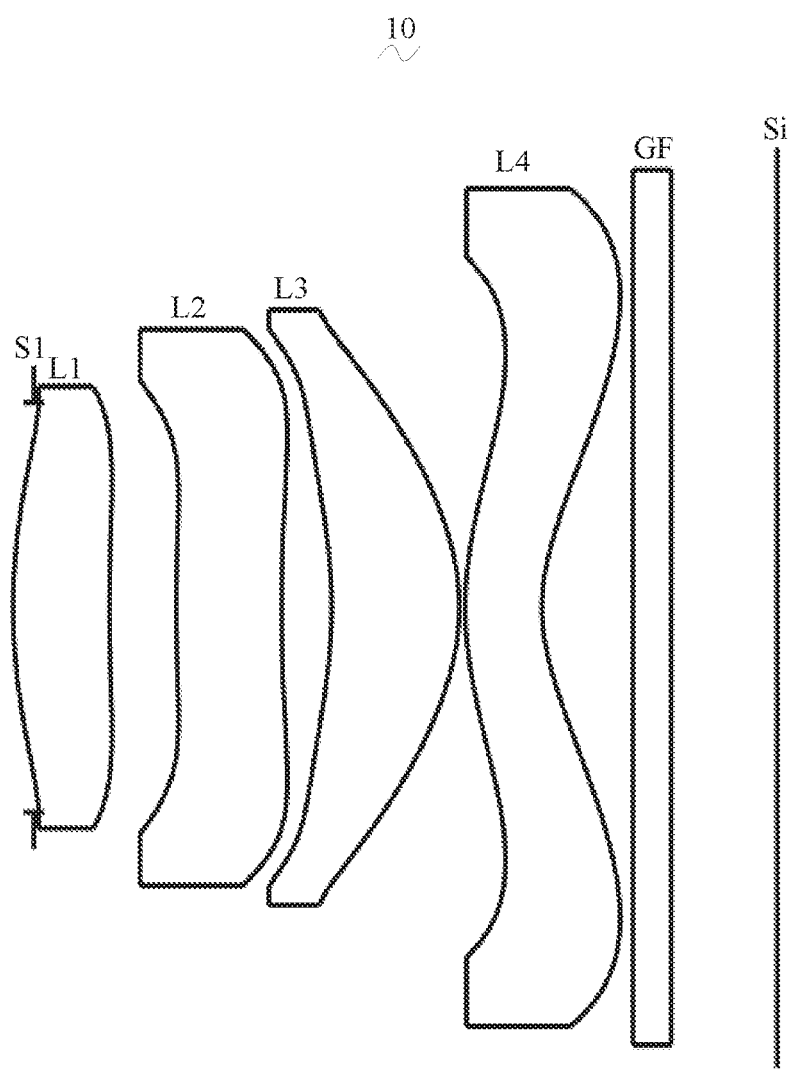
FIG. 1 is a schematic diagram of a structure of a camera optical lens according to Embodiment 1 of the present disclosure.

Please refer to the accompanying drawings, the present disclosure provides a camera optical lens 10. FIG. 1 shows a camera optical lens 10 of Embodiment 1 of the present disclosure, and the camera optical lens 10 includes fourth lenses. Specifically, the camera optical lens 10 includes, from an object side to an image side in sequence: an aperture S1, a first lens L1 having a positive refractive power, a second lens L2 having a positive refractive power, a third lens L3 having a positive refractive power, and a fourth lens L4 having a refractive power. An optical element such as an optical filter GF is arranged between the fourth lens L4 and an image surface Si.

In the embodiment, an on-axis thickness of the third lens L3 is defined as d5, an on-axis distance from an image-side surface of the third lens to an object-side surface of the fourth lens is defined as d6, and the camera optical lens 10 satisfies the following condition: $10.00 \leq d5/d6 \leq 25.00$, the condition specifies a ratio of a thickness of the third lens and an air gap distance between the third lens and the fourth lens, within a range of which it helps reduce a total length of the camera optical lens 10, thereby achieving ultra-thinness.

A focal length of the second lens is defined as f2, a focal length of the camera optical lens is defined as f, and the camera optical lens 10 satisfies the following condition: $2.00 \leq f2/f \leq 9.00$, the condition specifies a ratio of a focal length of the second lens and a focal length of the camera optical lens, which can effectively balance spherical aberration of the second lens and a field curvature of the camera optical lens.

A focal length of the fourth lens is defined as f4, a focal length of the camera optical lens is defined as f, and the camera optical lens 10 satisfies the following condition: $-2.00 \leq f4/f \leq 10.41$, the condition specifies a ratio of a focal length of the fourth lens and a focal length of the camera optical lens, within a range of which it helps enable the camera optical lens 10 to have better imaging quality and lower sensitivity by reasonably distributing a focal power.

A curvature radius of the object-side surface of the fourth lens L4 is defined as R7, a curvature radius of the image-side surface of the fourth lens L4 is defined as R8, and the camera optical lens 10 satisfies the following condition: $3.00 \leq (R7+R8)/(R7-R8) \leq 25.00$, the condition specifies a shape of the fourth lens L4, within a range of which it helps correct off-axis aberration with the development towards the wide angle and ultra-thinness.

An on-axis thickness of the first lens L1 is defined as d1, a total optical length from the object-side surface of the first lens L1 to the image surface Si of the camera optical lens 10 along the optical axis is defined as TTL, and the camera optical lens 10 satisfies the following condition: $0.10 \leq d1/TTL \leq 0.30$, the condition specifies a ratio of a thickness of the first lens and the total length of the camera optical lens 10, within a range of which it helps processing of the lenses and assembling of the camera lens.

A curvature radius of the object-side surface of the first lens L1 is defined as R1, a curvature radius of the image-side surface of the first lens L1 is defined as R2, and the camera optical lens 10 satisfies the following condition: $-5.00 \leq (R1+R2)/(R1-R2) \leq -0.50$, the condition specifies a shape of the first lens L1, within a range of which it helps correct the aberration of the camera optical lens 10, thereby improving the imaging quality.

A focal length of the first lens is defined as f1, a focal length of the camera optical lens is defined as f, and the camera optical lens 10 satisfies the following condition: $0.73 \leq f1/f \leq 5.07$, the condition specifies a ratio of a positive refractive power of the first lens and a focal length of the camera optical lens, within a range of which the first lens has a suitable positive refractive power which helps reduce the aberration of the camera optical lens 10, and is beneficial for the camera optical lens 10 to develop towards a wide angle and ultra-thinness.

A curvature radius of an object-side surface of the second lens L2 is defined as R3, a curvature radius of an image-side surface of the second lens L2 is defined as R4, and the camera optical lens 10 satisfies the following condition: $-9.13 \leq (R3+R4)/(R3-R4) \leq 11.37$, the condition specifies a shape of the second lens L2, within a range of which it helps correct on-axis chromatic aberration with the development of the camera lens towards the wide angle and ultra-thinness.

An on-axis thickness of the second lens L2 is defined as d3, a total optical length from the object-side surface of the first lens L1 to the image surface Si of the camera optical lens 10 along the optical axis is defined as TTL, and the camera optical lens 10 satisfies the following condition: $0.05 \leq d3/TTL \leq 0.24$, the condition being satisfied is beneficial for achieving ultra-thinness.

A focal length of the third lens L3 is defined as f3, a focal length of the camera optical lens 10 is defined as f, and the camera optical lens 10 satisfies the following condition: $0.40 \leq f3/f \leq 40.78$, the condition being satisfied can reasonably distribute a focal power, within a range of which it helps enable the camera optical lens 10 to have better imaging quality and lower sensitivity.

A curvature radius of the object-side surface of the third lens L3 is defined as R5, a curvature radius of the image-side surface of the third lens L3 is defined as R6, and the camera optical lens 10 satisfies the following condition: $-52.95 \leq (R5+R6)/(R5-R6) \leq 5.93$. The condition being satisfied can effectively control a shape of the third lens L3, thereby facilitating shaping of the third lens L3 and avoiding bad shaping and generation of stress due to an overly large surface curvature of the third lens L3.

An on-axis thickness of the third lens L3 is defined as d5, a total optical length from the object-side surface of the first lens L1 to the image surface Si of the camera optical lens 10 along the optical axis is defined as TTL, and the camera optical lens 10 satisfies the following condition: $0.05 \leq d5/TTL \leq 0.25$, the condition being satisfied is beneficial for achieving ultra-thinness.

An on-axis thickness of the fourth lens L4 is defined as d7, a total optical length from the object-side surface of the first lens L1 to the image surface Si of the camera optical lens 10 along the optical axis is defined as TTL, and the camera optical lens 10 satisfies the following condition: $0.03 \leq d7/TTL \leq 0.22$, the condition being satisfied is beneficial for achieving ultra-thinness.

In this embodiment, an F number of the camera optical lens 10 is defined as FNO, that is, a ratio of an effective focal length and an entrance pupil diameter, which satisfies the following condition: $FNO \leq 1.84$, it is beneficial for achieving the large aperture and better image quality.

In this embodiment, a combined focal length of the first lens and the second lens is defined as f12, and the camera optical lens 10 satisfies the following condition: $0.58 \leq f12/f \leq 2.81$, the condition being satisfied can eliminate the aberration and distortion of the camera optical lens 10, suppress the back focal length of the camera optical lens 10 to maintain the miniaturization of the camera optical lens 10.

When the above conditions are satisfied, the camera optical lens 10 with good optical imaging functions can satisfy a design requirement of a large aperture, ultra-thinness and a wide angle, According to the characteristics of the camera optical lens 10, the camera optical lens 10 is especially fit for WEB camera lenses and mobile phone camera lens assemblies composed by such camera elements as CCD and CMOS.

In addition, the camera optical lens of the present disclosure is a TOF (Time of flight) lens at a receiving end. The principle of TOF technology is that a lens at an emitting end emits an infrared surface light source, which is reflected back by an object, and the lens at the receiving end receives the reflected infrared light information. The 3D recognition process is realized. The working wavelength range of the camera optical lens of the present application is 920 nm-960 nm.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (a total optical length from the object-side surface of the first lens L1 to the image surface Si of the camera optical lens 10 along an optical axis) in mm.

Preferably, inflexion points and/or arrest points can be arranged on the object-side surface and/or the image-side surface of the lens, so as to satisfy the demand for high quality imaging. The description below can be referred for specific implementations.

Table 1 and Table 2 list design data of the camera optical lens 10 in Embodiment 1 of the present disclosure.

TABLE 1

|     | R      | d     |        | nd     |    | vd    |
|-----|--------|-------|--------|--------|----|-------|
| S1  | ∞      | d0=   | −0.115 |        |    |       |
| R1  | 2.379  | d1=   | 0.527  | nd1    | 1.6503 v1 | 21.55 |
| R2  | 6.046  | d2=   | 0.366  |        |    |       |
| R3  | 5.173  | d3=   | 0.580  | nd2    | 1.6503 v2 | 21.55 |
| R4  | 8.075  | d4=   | 0.273  |        |    |       |
| R5  | −1.923 | d5=   | 0.701  | nd3    | 1.6503 v3 | 21.55 |
| R6  | −0.869 | d6=   | 0.032  |        |    |       |
| R7  | 1.316  | d7=   | 0.420  | nd4    | 1.6503 v4 | 21.55 |
| R8  | 0.707  | d8=   | 0.500  |        |    |       |
| R9  | ∞      | d9=   | 0.210  | ndg    | 1.5168 vg | 64.17 |
| R10 | ∞      | d10=  | 0.580  |        |    |       |

Where: meanings of various symbols will be described as follows.

S1: aperture;

R: curvature radius of an optical surface;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of an object-side surface of the optical filter GF;

R10: curvature radius of an image-side surface of the optical filter GF;

d: on-axis thickness of a lens or on-axis distance between neighboring lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the optical filter GF;
d9: on-axis thickness of the optical filter GF;
d10: on-axis distance from the image-side surface of the optical filter GF to the image surface Si;
nd: refractive index of the d line;
nd 1: refractive index of the d line of the first lens L1;
nd2: refractive index of the d line of the second lens L2;
nd3: refractive index of the d line of the third lens L3;
nd4: refractive index of the d line of the fourth lens L4;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
vg: abbe number of the optical filter GF.

Table 2 shows aspheric data of each lens of the camera optical lens 10 in Embodiment 1 of the present disclosure.

TABLE 3

| | Number(s) of inflexion points | Inflexion point position 1 | Inflexion point position 2 | Inflexion point position 3 |
|---|---|---|---|---|
| P1R1 | 1 | 0.695 | 0 | 0 |
| P1R2 | 1 | 0.355 | 0 | 0 |
| P2R1 | 2 | 0.315 | 1.035 | 0 |
| P2R2 | 1 | 0.565 | 0 | 0 |
| P3R1 | 3 | 0.635 | 0.755 | 1.225 |
| P3R2 | 1 | 1.205 | 0 | 0 |
| P4R1 | 1 | 0.645 | 0 | 0 |
| P4R2 | 1 | 0.655 | 0 | 0 |

TABLE 4

| | Number(s) of arrest points | Arrest point position 1 |
|---|---|---|
| P1R1 | 0 | 0 |
| P1R2 | 1 | 0.575 |
| P2R1 | 1 | 0.505 |
| P2R2 | 1 | 0.795 |
| P3R1 | 0 | 0 |
| P3R2 | 0 | 0 |
| P4R1 | 1 | 1.165 |
| P4R2 | 1 | 1.435 |

TABLE 2

| | Conic coefficient | Aspheric surface coefficients | | | | | | |
|---|---|---|---|---|---|---|---|---|
| | k | A4 | A6 | A8 | A10 | A12 | A14 | A16 |
| R1 | −1.5570E+00 | 4.7981E−02 | −5.0156E−01 | 1.8842E+00 | −4.2517E+00 | 5.3767E+00 | −3.6064E+00 | 9.8209E−01 |
| R2 | −4.7450E+01 | −5.8354E−02 | −1.3185E−01 | 2.2119E−01 | −5.1817E−01 | 6.6896E−01 | −4.4198E−01 | 1.1649E−01 |
| R3 | 2.1366E+01 | −1.7735E−01 | 1.7988E−02 | −4.5271E−01 | 5.9858E−01 | −6.6926E−01 | 6.0409E−01 | −2.1886E−01 |
| R4 | 3.6177E+01 | 1.1011E−02 | 2.9822E−02 | −4.0067E−01 | 6.9866E−01 | −6.6266E−01 | 3.0782E−01 | −5.4550E−02 |
| R5 | 9.9965E−01 | 1.6178E−01 | 1.8352E−01 | −6.4363E−01 | 1.0064E+00 | −8.5855E−01 | 3.4892E−01 | −5.0797E−02 |
| R6 | −2.1888E+00 | 3.8942E−02 | −1.2207E−01 | 4.5190E−02 | 4.0036E−02 | −2.2694E−02 | −6.2292E−03 | 4.1325E−03 |
| R7 | −1.0499E+01 | 1.4054E−01 | −3.4260E−01 | 3.6399E−01 | −2.5942E−01 | 1.1617E−01 | −2.9206E−02 | 3.0822E−03 |
| R8 | −4.3497E+00 | −1.0213E−02 | −4.2596E−02 | 2.7242E−02 | −9.9038E−03 | 2.0620E−03 | −2.6333E−04 | 1.6301E−05 |

Where: k is a conic coefficient, and A4, A6, A8, A10, A12, A14, and A16 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

Figure 2:
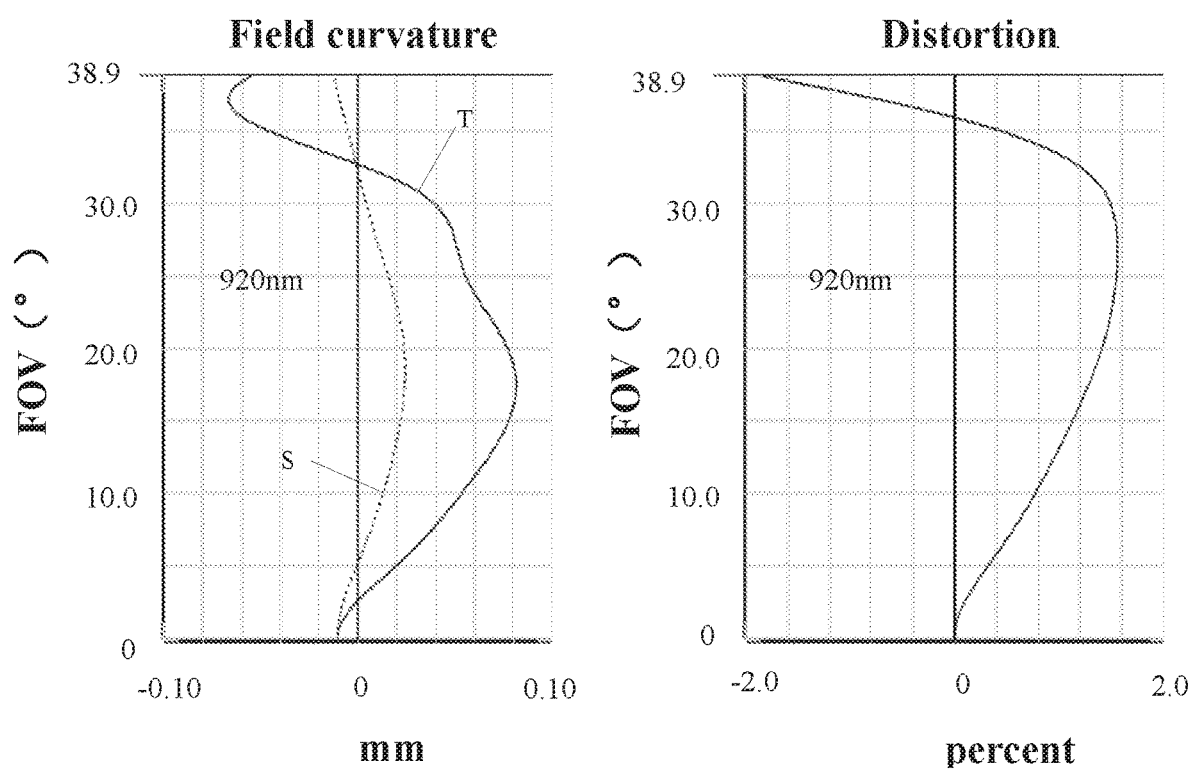
FIG. 2 is a schematic diagram of a field curvature and a distortion of the camera optical lens shown in FIG. 1.

FIG. 2 illustrates a field curvature and a distortion of light with a wavelength of 920 nm after passing the camera optical lens 10 according to Embodiment 1. A field curvature S in FIG. 2 is a field curvature in a sagittal direction, and T is a field curvature in a tangential direction.

Table 17 in the following shows various values of Embodiment 1, 2, 3 and 4 and values corresponding to parameters which are specified in the above conditions.

As shown in table 17, Embodiment 1 satisfies the various conditions.

In this embodiment, an entrance pupil diameter of the camera optical lens 10 is 1.886 mm, an image height of 1.0 H is 2.000 mm, an FOV (field of view) in a diagonal direction is 77.80°. Thus, the camera optical lens 10 has a wide-angle and a large aperture and is ultra-thin. Its on-axis and off-axis aberrations are fully corrected, thereby achieving excellent optical characteristics.

Embodiment 2

Figure 3:
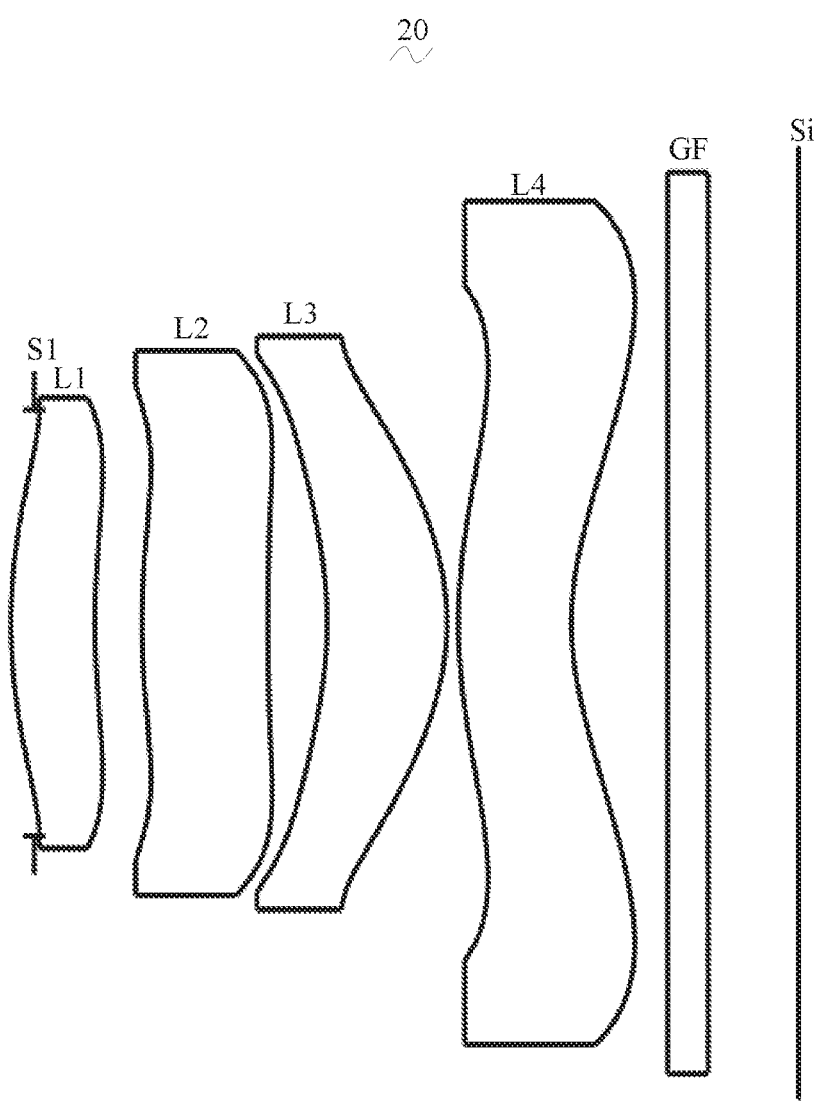
FIG. 3 is a schematic diagram of a structure of a camera optical lens according to Embodiment 2 of the present disclosure.

Embodiment 2 is basically the same as Embodiment 1 and involves symbols having the same meanings as Embodiment 1, a structure of a camera optical lens 20 according to Embodiment 2 can refer to FIG. 3, and only differences therebetween will be described in the following.

Table 5 and Table 6 show design data of a camera optical lens 20 in Embodiment 2 of the present disclosure.

TABLE 5

|    | R      | d    |        | nd     | vd    |
|----|--------|------|--------|--------|-------|
| S1 | ∞      | d0=  | −0.121 |        |       |
| R1 | 2.091  | d1=  | 0.438  | nd1 1.6503 | v1 21.55 |
| R2 | 3.164  | d2=  | 0.244  |        |       |
| R3 | 3.005  | d3=  | 0.655  | nd2 1.6503 | v2 21.55 |
| R4 | 12.451 | d4=  | 0.307  |        |       |
| R5 | −1.651 | d5=  | 0.624  | nd3 1.6503 | v3 21.55 |
| R6 | −0.984 | d6=  | 0.060  |        |       |
| R7 | 2.039  | d7=  | 0.587  | nd4 1.6503 | v4 21.55 |
| R8 | 1.091  | d8=  | 0.500  |        |       |
| R9 | ∞      | d9=  | 0.210  | ndg 1.5168 | vg 64.17 |
| R10| ∞      | d10= | 0.470  |        |       |

Table 6 shows aspheric data of each lens of the camera optical lens 20 in Embodiment 2 of the present disclosure.

TABLE 6

|    | Conic coefficient | Aspheric surface coefficients | | | | | | |
|    | k | A4 | A6 | A8 | A10 | A12 | A14 | A16 |
|----|---|----|----|----|-----|-----|-----|-----|
| R1 | −4.1618E+00 | 5.5143E−02 | −4.6629E−01 | 1.8287E+00 | −4.2599E+00 | 5.4009E+00 | −3.5717E+00 | 9.4941E−01 |
| R2 | −1.3272E+01 | −6.9142E−02 | −1.5257E−01 | 2.1657E−01 | −5.1197E−01 | 6.8292E−01 | −4.4258E−01 | 1.1144E−01 |
| R3 | 6.3806E+00 | −1.3582E−01 | −8.6145E−03 | −3.9613E−01 | 5.9840E−01 | −6.7309E−01 | 5.9560E−01 | −2.2613E−01 |
| R4 | 9.8912E+01 | 3.2580E−02 | 2.0240E−02 | −4.1395E−01 | 7.0430E−01 | −6.5918E−01 | 3.0666E−01 | −5.4976E−02 |
| R5 | 5.7443E−01 | 1.4829E−01 | 1.7182E−01 | −6.3121E−01 | 1.0043E+00 | −8.6152E−01 | 3.5014E−01 | −4.8021E−02 |
| R6 | −1.6587E+00 | 9.2267E−02 | −1.2313E−01 | 3.9192E−02 | 4.2582E−02 | −2.0315E−02 | −5.8426E−03 | 4.1934E−03 |
| R7 | −2.4894E+01 | 1.7084E−01 | −3.7059E−01 | 3.8422E−01 | −2.6401E−01 | 1.1480E−01 | −2.8854E−02 | 3.1368E−03 |
| R8 | −6.1306E+00 | 1.3665E−03 | −4.1161E−02 | 2.6593E−02 | −1.0125E−02 | 2.0155E−03 | −2.0374E−04 | 7.3240E−06 |

Table 7 and table 8 show design data of inflexion points and arrest points of each lens of the camera optical lens 20 lens according to Embodiment 2 of the present disclosure.

TABLE 7

|      | Number(s) of inflexion points | Inflexion point position 1 | Inflexion point position 2 |
|------|-------------------------------|----------------------------|----------------------------|
| P1R1 | 1 | 0.675 | 0 |
| P1R2 | 1 | 0.415 | 0 |
| P2R1 | 2 | 0.445 | 1.045 |
| P2R2 | 1 | 0.555 | 0 |
| P3R1 | 1 | 1.155 | 0 |
| P3R2 | 1 | 0.965 | 0 |
| P4R1 | 1 | 0.655 | 0 |
| P4R2 | 1 | 0.715 | 0 |

TABLE 8

|      | Number of arrest points | Arrest point position 1 |
|------|-------------------------|-------------------------|
| P1R1 | 1 | 0.945 |
| P1R2 | 1 | 0.665 |
| P2R1 | 1 | 0.695 |
| P2R2 | 1 | 0.755 |
| P3R1 | 0 | 0 |
| P3R2 | 0 | 0 |
| P4R1 | 1 | 1.135 |
| P4R2 | 1 | 1.425 |

Figure 4:
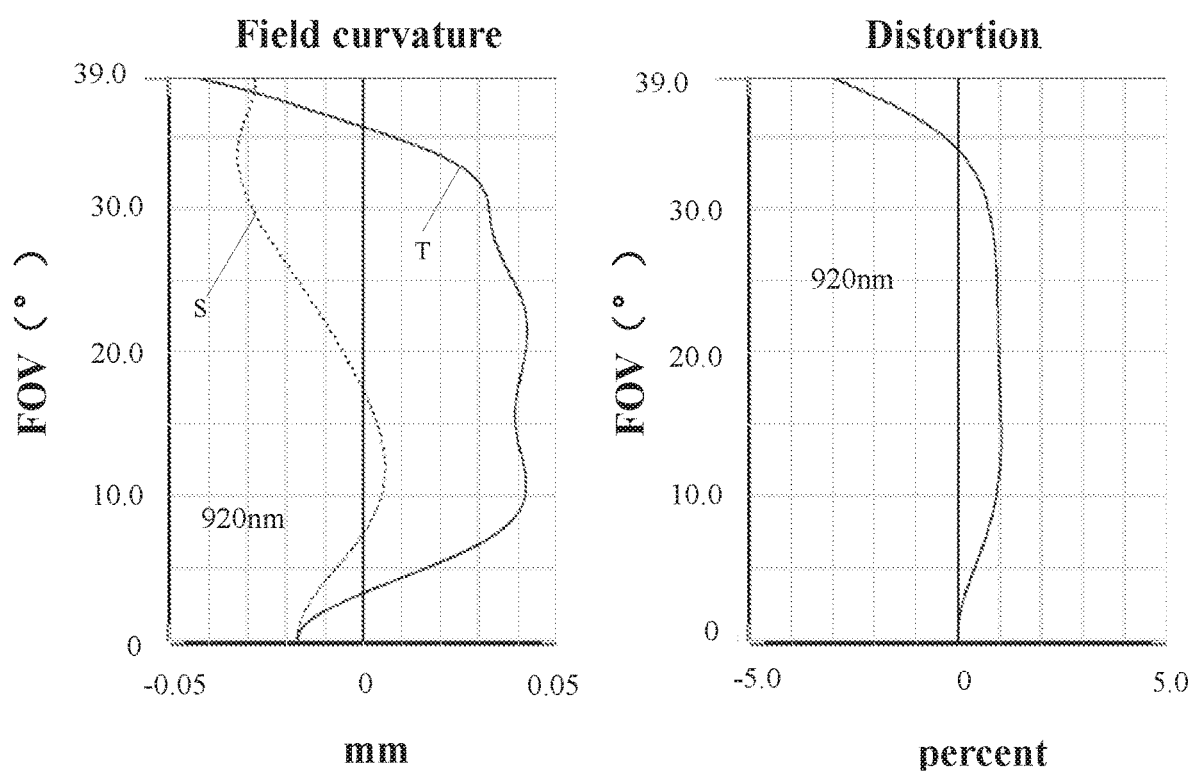
FIG. 4 is a schematic diagram of a field curvature and a distortion of the camera optical lens shown in FIG. 3.

FIG. 4 illustrates a field curvature and a distortion of light with a wavelength of 920 nm after passing the camera optical lens 20 according to Embodiment 2. A field curvature S in FIG. 4 is a field curvature in a sagittal direction, and T is a field curvature in a tangential direction.

Table 17 in the following shows values corresponding to parameters which are specified in the above conditions of Embodiments 2. Obviously, the camera optical lens 20 of Embodiment 2 satisfies the various conditions.

In this embodiment, an entrance pupil diameter of the camera optical lens 20 is 1.370 mm, an image height of 1.0 H is 2.000 mm, an FOV (field of view) in the diagonal direction is 78.00°. Thus, the camera optical lens 20 has a wide-angle and a large aperture and is ultra-thin. Its on-axis and off-axis aberrations are fully corrected, thereby achieving excellent optical characteristics.

Embodiment 3

Figure 5:
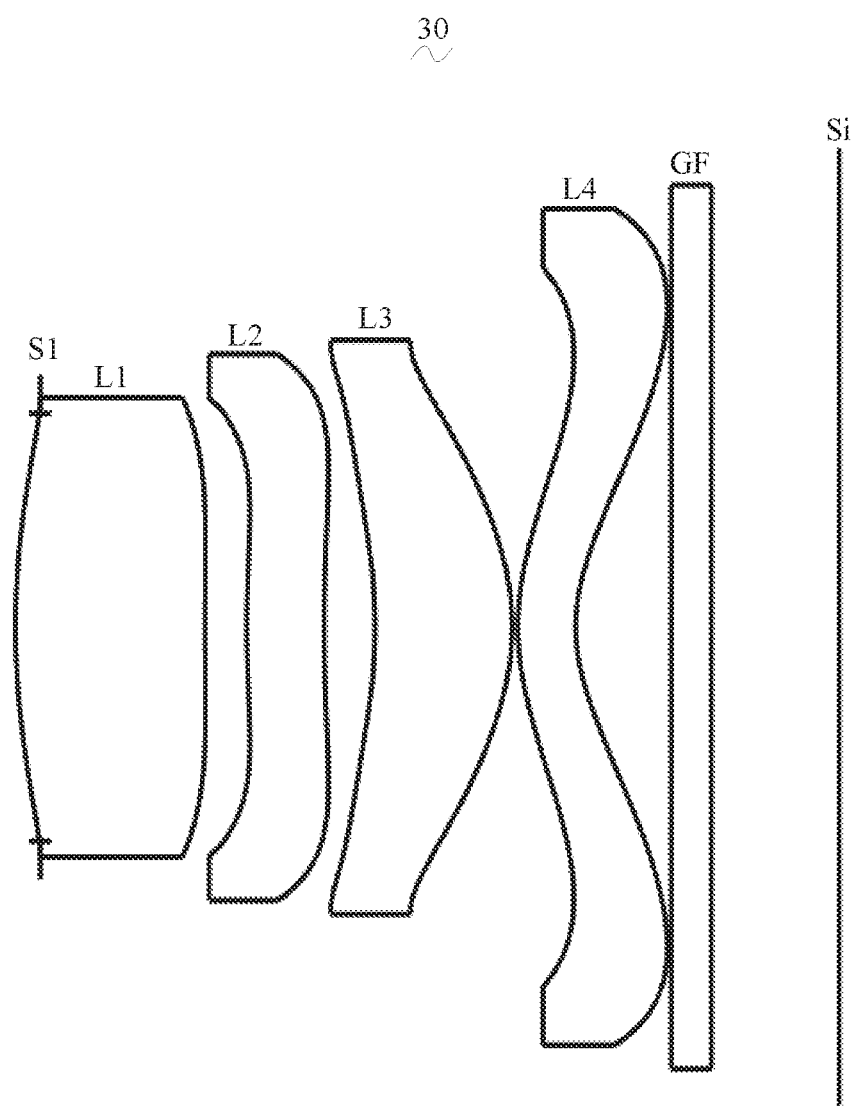
FIG. 5 is a schematic diagram of a structure of a camera optical lens according to Embodiment 3 of the present disclosure.

Embodiment 3 is basically the same as Embodiment 1 and involves symbols having the same meanings as Embodiment 1, a structure of a camera optical lens 30 according to Embodiment 3 can refer to FIG. 5, and only differences therebetween will be described in the following.

Table 9 and Table 10 show design data of the camera optical lens 30 in

Embodiment 3 of the present disclosure.

TABLE 9

|    | R      | d    |        | nd     | vd    |
|----|--------|------|--------|--------|-------|
| S1 | ∞      | d0=  | −0.130 |        |       |
| R1 | 2.954  | d1=  | 0.991  | nd1 1.6503 | v1 21.55 |
| R2 | 14.236 | d2=  | 0.217  |        |       |
| R3 | 4.084  | d3=  | 0.406  | nd2 1.6503 | v2 21.55 |
| R4 | 8.578  | d4=  | 0.264  |        |       |
| R5 | −1.842 | d5=  | 0.715  | nd3 1.6503 | v3 21.55 |
| R6 | −0.950 | d6=  | 0.029  |        |       |
| R7 | 0.965  | d7=  | 0.301  | nd4 1.6503 | v4 21.55 |
| R8 | 0.632  | d8=  | 0.500  |        |       |
| R9 | ∞      | d9=  | 0.210  | ndg 1.5168 | vg 64.17 |
| R10| ∞      | d10= | 0.669  |        |       |

Table 10 shows aspheric data of each lens of the camera optical lens 30 in Embodiment 3 of the present disclosure.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | −3.5019E+00 | 4.4554E−02 | −4.6106E−01 | 1.8852E+00 | −4.2911E+00 | 5.3644E+00 | −3.4769E+00 | 9.1075E−01 |
| R2 | 4.2149E+01 | −1.3048E−01 | −1.0411E+01 | 2.7131E−01 | −5.3355E−01 | 6.7139E−01 | −4.2021E−01 | 9.6184E−02 |
| R3 | −2.0101E+00 | −1.8024E−01 | −6.7292E−02 | −3.8212E−01 | 6.4933E−01 | −6.1341E−01 | 6.2100E−01 | −3.3077E−01 |
| R4 | −9.9261E+00 | 2.1143E−02 | −2.8030E−02 | −3.9723E−01 | 7.3495E−01 | −6.6960E−01 | 2.9811E−01 | −5.2778E−02 |
| R5 | 1.0251E+00 | 1.8246E−01 | 1.8390E−01 | −6.4692E−01 | 9.8504E−01 | −8.4795E−01 | 3.6982E−01 | −5.9034E−02 |
| R6 | −1.8127E+00 | 9.5191E−02 | −1.2498E−01 | 3.8300E−02 | 4.3003E−02 | −2.0555E−02 | −7.0362E−03 | 5.3232E−03 |
| R7 | −6.6501E+00 | 1.5089E−01 | −3.7418E−01 | 3.8370E−01 | −2.6348E−01 | 1.1536E−01 | −2.8653E−02 | 3.0109E−03 |
| R8 | −3.4440E+00 | −2.4896E−02 | −3.9750E−02 | 2.7294E−02 | −1.0067E−02 | 1.9873E−03 | −2.1637E−04 | 5.6094E−06 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 0.795 | 0 | 0 |
| P1R2 | 1 | 0.215 | 0 | 0 |
| P2R1 | 1 | 0.315 | 0 | 0 |
| P2R2 | 1 | 0.475 | 0 | 0 |
| P3R1 | 3 | 0.645 | 0.725 | 1.105 |
| P3R2 | 1 | 0.955 | 0 | 0 |
| P4R1 | 1 | 0.635 | 0 | 0 |
| P4R2 | 1 | 0.645 | 0 | 0 |

TABLE 12

| | Number of arrest points | Arrest point position 1 |
|---|---|---|
| P1R1 | 0 | 0 |
| P1R2 | 1 | 0.355 |
| P2R1 | 1 | 0.505 |
| P2R2 | 1 | 0.685 |
| P3R1 | 0 | 0 |
| P3R2 | 1 | 1.245 |
| P4R1 | 1 | 1.195 |
| P4R2 | 1 | 1.415 |

Figure 6:
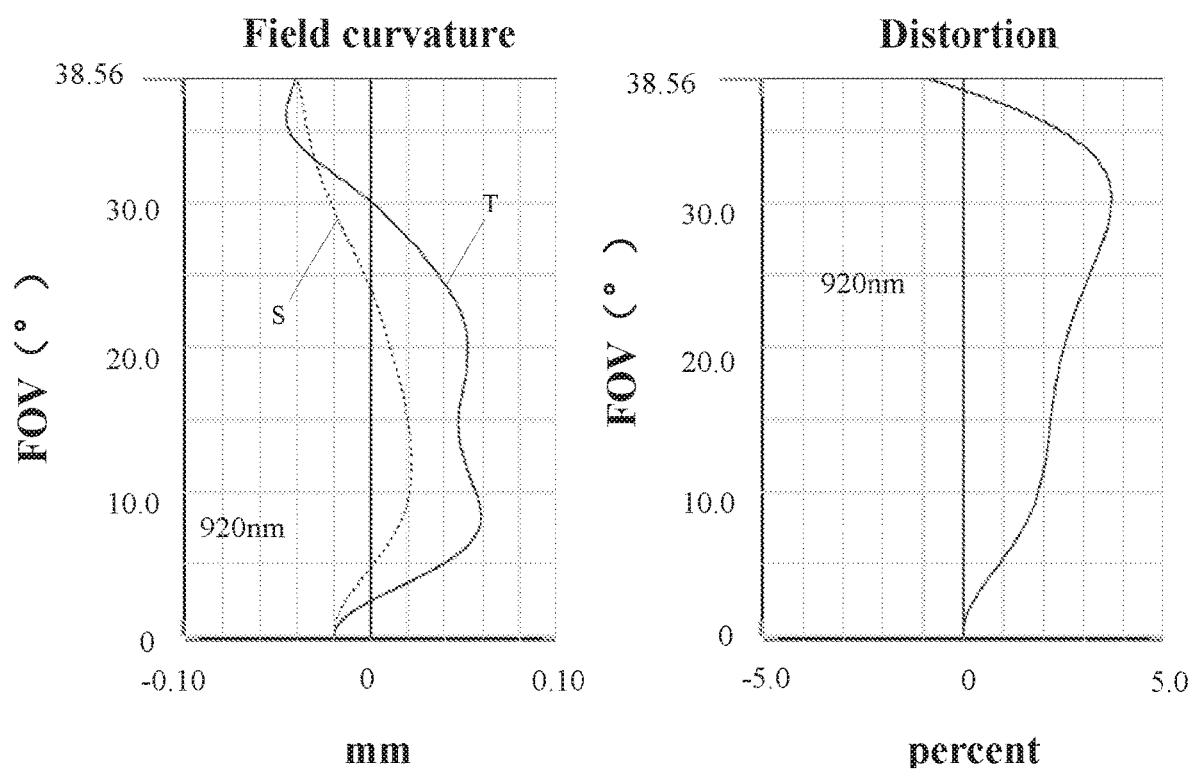
FIG. 6 is a schematic diagram of a field curvature and a distortion of the camera optical lens shown in FIG. 5.

FIG. 6 illustrates a field curvature and a distortion of light with a wavelength of 920 nm after passing the camera optical lens 30 according to Embodiment 3. A field curvature S in FIG. 6 is a field curvature in a sagittal direction, and T is a field curvature in a tangential direction.

Table 17 in the following shows values corresponding to parameters which are specified in the above conditions of Embodiments 3.

Obviously, the camera optical lens 30 of Embodiment 3 satisfies the various conditions.

In this embodiment, an entrance pupil diameter of the camera optical lens 30 is 1.887 mm, an image height of 1.0 H is 2.000 mm, an FOV (field of view) in the diagonal direction is 77.11°. Thus, the camera optical lens 30 has a wide-angle and a large aperture and is ultra-thin. Its on-axis and off-axis aberrations are fully corrected, thereby achieving excellent optical characteristics.

Embodiment 4

Figure 7:
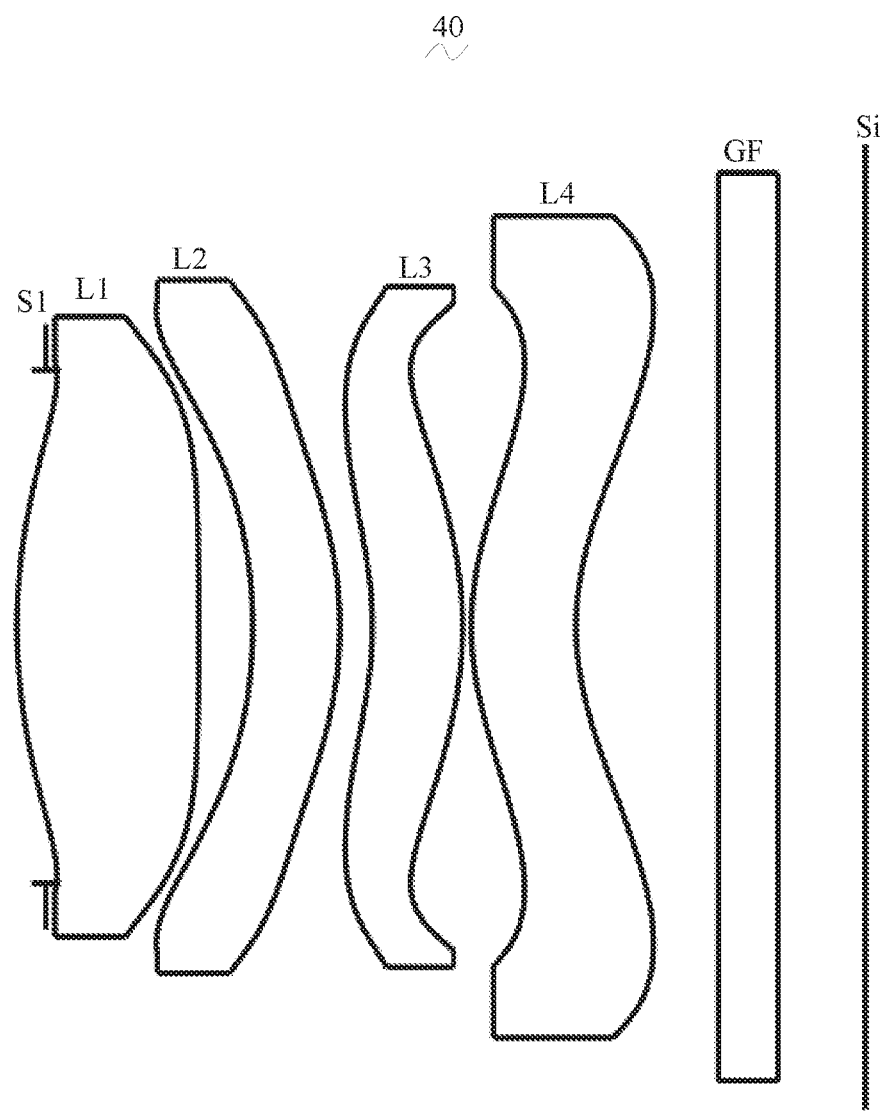
FIG. 7 is a schematic diagram of a structure of a camera optical lens according to Embodiment 4 of the present disclosure.

Embodiment 4 is basically the same as Embodiment 1 and involves symbols having the same meanings as Embodiment 1, a structure of a camera optical lens 40 according to Embodiment 4 can refer to FIG. 7, and only differences therebetween will be described in the following.

Table 13 and Table 14 show design data of the camera optical lens 40 in Embodiment 4 of the present disclosure.

TABLE 13

| | R | d | | nd | | vd |
|---|---|---|---|---|---|---|
| S1 | ∞ | d0= | −0.102 | | | |
| R1 | 1.807 | d1= | 0.639 | nd1 | 1.6610 | v1 | 20.53 |
| R2 | −36.278 | d2= | 0.190 | | | |
| R3 | −1.519 | d3= | 0.307 | nd2 | 1.6610 | v2 | 20.53 |
| R4 | −1.165 | d4= | 0.114 | | | |
| R5 | −1.070 | d5= | 0.317 | nd3 | 1.6610 | v3 | 20.53 |
| R6 | −1.154 | d6= | 0.031 | | | |
| R7 | 0.946 | d7= | 0.368 | nd4 | 1.6610 | v4 | 20.53 |
| R8 | 0.870 | d8= | 0.500 | | | |
| R9 | ∞ | d9= | 0.210 | ndg | 1.5168 | vg | 64.17 |
| R10 | ∞ | d10= | 0.308 | | | |

Table 14 shows aspheric data of each lens of the camera optical lens 40 in Embodiment 4 of the present disclosure.

TABLE 14

| | Conic coefficient | Aspherical surface coefficients | | | | | | |
|---|---|---|---|---|---|---|---|---|
| | k | A4 | A6 | A8 | A10 | A12 | A14 | A16 |
| R1 | −8.0837E−01 | −2.8472E−02 | 8.9246E−02 | −7.3663E−01 | 1.3799E+00 | −1.2001E+00 | −3.1819E−02 | 2.7568E−01 |
| R2 | 1.1557E+02 | −1.1659E−01 | −3.6072E−02 | −5.7032E−01 | 7.0795E−01 | 9.2935E−02 | −5.7827E−01 | 2.7550E−01 |
| R3 | 7.2584E−01 | −1.3571E−01 | 2.4627E−01 | −9.8862E−02 | 1.8722E−01 | −2.4267E−01 | 1.9503E−01 | −4.6485E−02 |
| R4 | −1.9812E+00 | 1.1791E−01 | −1.4465E−01 | 1.1290E+00 | −2.4995E+00 | 2.4586E+00 | −1.2338E+00 | 2.6127E−01 |

TABLE 14-continued

| | Conic coefficient | Aspherical surface coefficients | | | | | | |
|---|---|---|---|---|---|---|---|---|
| | k | A4 | A6 | A8 | A10 | A12 | A14 | A16 |
| R5 | −9.6560E+00 | 2.6800E−01 | −3.7450E−01 | 1.1810E+00 | −2.3377E+00 | 2.5747E+00 | −1.3779E+00 | 2.7404E−01 |
| R6 | −9.3496E+00 | −4.8845E−02 | −8.1523E−01 | 3.2666E+00 | −4.8434E+00 | 3.2373E+00 | −3.5129E−01 | −3.2427E−01 |
| R7 | −3.6244E−01 | −4.1605E−01 | −9.7336E−01 | 3.6078E+00 | −6.5165E+00 | 6.3474E+00 | −3.2248E+00 | 6.5108E−01 |
| R8 | −7.0267E−01 | −4.8984E−01 | 1.4436E−01 | 2.9104E−02 | −1.1052E−01 | 7.3014E−02 | −2.5497E−02 | 3.7107E−03 |

Table 15 and Table 16 show design data inflexion points and arrest points of the respective lenses in the camera optical lens 40 according to Embodiment 4 of the present disclosure.

TABLE 15

| | Number(s) of inflexion points | Inflexion point position 1 | Inflexion point position 2 | Inflexion point position 3 |
|---|---|---|---|---|
| P1R1 | 1 | 0.615 | 0 | 0 |
| P1R2 | 1 | 0.975 | 0 | 0 |
| P2R1 | 1 | 0.795 | 0 | 0 |
| P2R2 | 3 | 0.585 | 0.735 | 1.105 |
| P3R1 | 2 | 0.365 | 1.075 | 0 |
| P3R2 | 2 | 0.595 | 1.045 | 0 |
| P4R1 | 2 | 0.475 | 1.115 | 0 |
| P4R2 | 1 | 0.555 | 0 | 0 |

TABLE 16

| | Number of arrest points | Arrest point position 1 |
|---|---|---|
| P1R1 | 1 | 0.825 |
| P1R2 | 0 | 0 |
| P2R1 | 1 | 1.045 |
| P2R2 | 0 | 0 |
| P3R1 | 1 | 0.725 |
| P3R2 | 1 | 0.845 |
| P4R1 | 1 | 0.865 |
| P4R2 | 1 | 1.055 |

Figure 8:
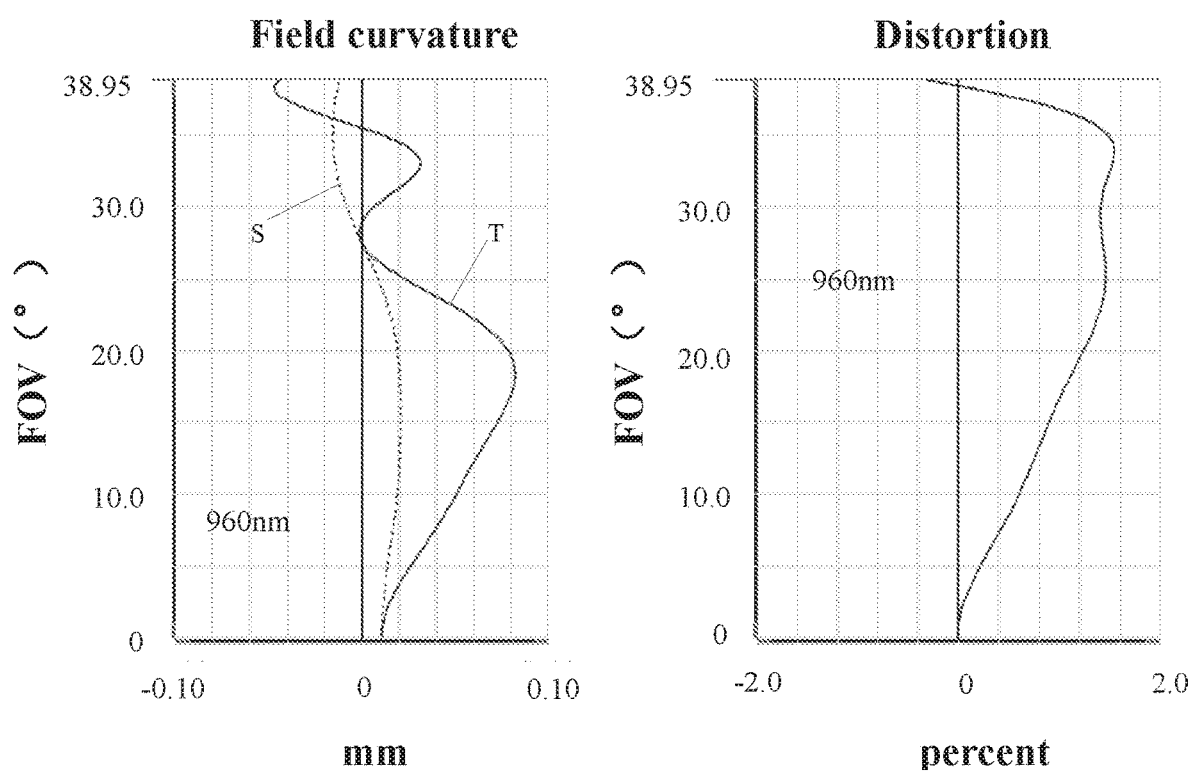
FIG. 8 is a schematic diagram of a field curvature and a distortion of the camera optical lens shown in FIG. 7.

FIG. 8 illustrates a field curvature and a distortion of light with a wavelength of 960 nm after passing the camera optical lens 40 according to Embodiment 4. A field curvature S in FIG. 8 is a field curvature in a sagittal direction, and T is a field curvature in a tangential direction.

Table 17 in the following shows values corresponding to parameters which are specified in the above conditions of Embodiments 4.

Obviously, the camera optical lens 40 of Embodiment 4 satisfies the various conditions.

In this embodiment, an entrance pupil diameter of the camera optical lens 40 is 1.696 mm, an image height of 1.0 H is 1.500 mm, an FOV (field of view) in the diagonal direction is 77.90°. Thus, the camera optical lens 40 has a wide-angle and a large aperture and is ultra-thin. Its on-axis and off-axis aberrations are fully corrected, thereby achieving excellent optical characteristics.

TABLE 17

| Parameters and conditions | Embodiment 1 | Embodiment 2 | Embodiment 3 | Embodiment 4 |
|---|---|---|---|---|
| f | 2.509 | 2.520 | 2.509 | 1.866 |
| f1 | 5.938 | 8.519 | 5.761 | 2.728 |
| f2 | 21.355 | 6.164 | 12.035 | 5.883 |

TABLE 17-continued

| Parameters and conditions | Embodiment 1 | Embodiment 2 | Embodiment 3 | Embodiment 4 |
|---|---|---|---|---|
| f3 | 2.019 | 2.864 | 2.395 | 50.729 |
| f4 | −3.330 | −4.917 | −4.481 | 19.430 |
| f12 | 4.695 | 3.784 | 4.065 | 2.156 |
| Fno | 1.33 | 1.84 | 1.33 | 1.10 |
| d5/d6 | 21.91 | 10.40 | 24.66 | 10.23 |
| f2/f | 8.51 | 2.45 | 4.80 | 3.15 |
| f4/f | −1.33 | −1.95 | −1.79 | 10.41 |
| (R7 + R8)/(R7 − R8) | 3.32 | 3.30 | 4.80 | 23.89 |

Where: Fno is the F number of the camera optical lens.

Those of ordinary skill in the art can understand that the above embodiments are only examples of the present disclosure. In practical applications, various changes and modifications can be made in details and forms without departing the spirits and the scope of the present disclosure.

What is claimed is:

1. A camera optical lens comprising, from an object side to an image side in sequence:
   a first lens having a positive refractive power;
   a second lens having a positive refractive power;
   a third lens having a positive refractive power;
   a fourth lens having a refractive power; and
   wherein the camera optical lens satisfies following conditions:
   $10.00 \leq d5/d6 \leq 25.00$;
   $00 \leq f2/f \leq 9.00$;
   $0.40 \leq f3/f \leq 40.78$;
   $-52.95 \leq (R5+R6)/(R5-R6) \leq 5.93$;
   $0.05 \leq d5/TTL \leq 0.25$;
   $-2.00 \leq f4/f \leq 10.41$; and
   $3.00 \leq (R7+R8)/(R7-R8) \leq 25.00$;
   where
   d5 denotes an on-axis thickness of the third lens;
   d6 denotes an on-axis distance from an image-side surface of the third lens to an object-side surface of the fourth lens;
   f2 denotes a focal length of the second lens;
   f denotes a focal length of the camera optical lens;
   f4 denotes a focal length of the fourth lens;
   R7 denotes a curvature radius of an object-side surface of the fourth lens;
   R8 denotes a curvature radius of an image-side surface of the fourth lens;
   f3 denotes a focal length of the third lens;
   R5 denotes a curvature radius of an object-side surface of the third lens;
   R6 denotes a curvature radius of an image-side surface of the third lens; and
   TTL denotes a total optical length from an object-side surface of the first lens to an image surface of the camera optical lens along an optical axis.

2. The camera optical lens according to claim 1 further satisfying the following condition:

$0.10 \le d1/TTL \le 0.30$;

where d1 denotes an on-axis thickness of the first lens.

3. The camera optical lens according to claim 1 further satisfying the following condition:

$-5.00 \le (R1+R2)/(R1-R2) \le -0.50$;

where

R1 denotes a curvature radius of an object-side surface of the first lens; and

R2 denotes a curvature radius of an image-side surface of the first lens.

4. The camera optical lens according to claim 1 further satisfying the following conditions:

$0.73 \le f1/f \le 5.07$;

where f1 denotes a focal length of the first lens.

5. The camera optical lens according to claim 1 further satisfying the following conditions:

$-9.13 \le (R3+R4)/(R3-R4) \le 11.37$; and
$0.05 \le d3/TTL \le 0.24$;

where

R3 denotes a curvature radius of an object-side surface of the second lens;

R4 denotes a curvature radius of an image-side surface of the second lens;

d3 denotes an on-axis thickness of the second lens.

6. The camera optical lens according to claim 1 further satisfying the following conditions:

$0.03 \le d7/TTL \le 0.22$;

where d7 denotes an on-axis thickness of the fourth lens.

7. The camera optical lens according to claim 1 further satisfying the following conditions:

$FNO \le 1.84$ where

FNO denotes an F number of the camera optical lens.

8. The camera optical lens according to claim 1 further satisfying the following conditions:

$0.58 \le f12/f \le 2.81$;

where f12 denotes a combined focal length of the first lens and the second lens.

* * * * *